United States Patent [19]
Nofel

[11] 3,969,875
[45] July 20, 1976

[54] SAFETY GROUNDING CIRCUITS

[75] Inventor: Thomas J. Nofel, Brookpark, Ohio

[73] Assignee: MTD Products Inc., Cleveland, Ohio

[22] Filed: Apr. 18, 1975

[21] Appl. No.: 569,561

[52] U.S. Cl. .............................. 56/10.2; 56/10.5; 56/DIG. 15
[51] Int. Cl.² ........................................ A01D 75/20
[58] Field of Search ............... 56/10.2, 10.5, 17.4, 56/320.2, DIG. 15, 202; 180/82 R; 192/.046, .098, 129 R, 129 A

[56] References Cited
UNITED STATES PATENTS

| | | | |
|---|---|---|---|
| 3,608,285 | 9/1971 | Berk | 56/10.2 |
| 3,885,547 | 5/1975 | Doepke | 56/10.5 X |

Primary Examiner—Louis G. Mancene
Assistant Examiner—J. N. Eskovitz
Attorney, Agent, or Firm—Woodling, Krost, Granger & Rust

[57] ABSTRACT

An electrical grounding system for grounding the ignition system of an internal combustion engine on a tractor or the like to prevent the starting of the engine and to stop the engine when operating unless switches of the grounding system are so set by operating conditions and positions of parts of the tractor or the like. The grounding system is arranged so that unless switches in an electrical circuit of the grounding system are set or maintained in proper position by operations of the tractor or the like, (such as the clutch of a grass cutting unit carried by the tractor or the like, such as the clutch of the drive mechanism of the tractor or the like, such as by the occupancy or non-occupancy of the seat of the tractor or the like, or such as the connection or dis-connection of a grass catcher to the tractor or the like) the ignition system of the engine is grounded or short circuited and the engine is inoperative.

9 Claims, 3 Drawing Figures

SAFETY GROUNDING CIRCUITS

An object of my invention is to provide improved safety means whereby the ignition circuit of an internal combustion engine on a tractor or the like is grounded to prevent operation of the tractor unless certain operating conditions of the tractor or the like are safe.

Another object is a novel provision for grounding the ignition circuit of an internal combustion engine of a grass mowing tractor unless the grass catcher is properly positioned in grass catching position on the tractor.

Another object is the provision of a unique arrangement through a grounding circuit for preventing the starting of a mower tractor unless the cutting unit and the drive mechanism are in an unclutched condition.

Another object is the provision for grounding the ignition system of a riding mower tractor if the seat of the operator of the tractor is unoccupied unless the cutting unit and drive mechanism are in an unclutched condition.

Another object is the provision for providing maximum safety in the operation and use of a mower tractor to prevent operation of the internal combustion engine of a mower tractor by grounding the ignition system of the engine unless all functioning parts are properly conditioned and positioned for safe operation of the mower tractor.

Other objects and a fuller understanding of this invention may be had by referring to the following description and claims, taken in conjunction with the accompanying drawings, in which:

Figure 1:
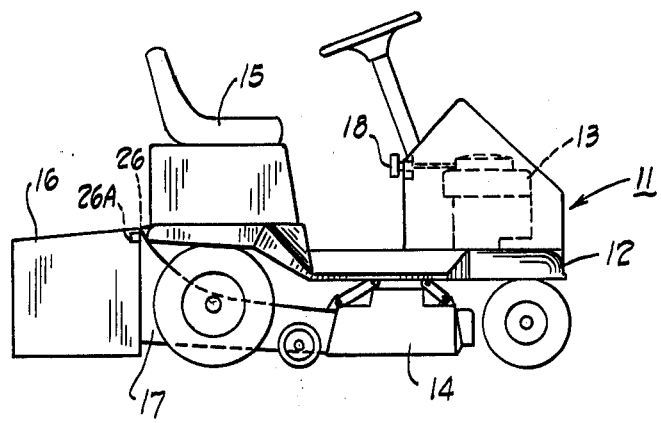
FIG. 1 is a side view of a mower tractor shown by way of an example of a tractor to which my invention may be applied.

The mower tractor illustrating the adaptation of my improved safety system to a tractor embodying a recoil type manually operable starter is indicated generally by the reference character 11 in FIG. 1. The tractor 11 has a chassis or frame 12 on which is mounted an internal combustion engine 13, which engine 13 has an ignition system which upon being grounded prevents operation of the engine. A usual body as well as the engine is carried on the chassis or frame 12.

Suspended from the frame 12 is a cutting unit 14 embodying rotating cutting blade means therein, the cutting unit being driven by the engine through suitable shafts, pulleys and belt. A clutch actuated by the operator of the tractor mower, occupying the seat 15 of the tractor mower, alternately loosens and tightens the belt in the usual manner. Therefore, the cutting unit may be alternately placed in a clutched and an unclutched condition.

The tractor is also driven forward and backward by a drive transmission, not shown, operatively engaged to the rear wheels of the tractor. The transmission is driven by the engine through suitable shafts, pulleys and belt. A clutch actuated by the operator of the tractor mower, occupying the seat 15 of the tractor mower, alternately loosens and tightens the belt in the usual manner. Therefore, the drive transmission may be alternately placed in a clutched and in an unclutched condition.

Carried on the rear end of the mower tractor is a grass catcher 16 which is of relatively rigid or self-sustaining construction. It has an open forward end directed forwardly to receive cut grass cut and blown by the cutting unit 14 and directed rearwardly from the cutting unit into the catcher 16 by a chute 17 carried by the mower. Thus, cut grass and blown air from the cutting unit 14 is discharged rearwardly into the catcher 16.

The catcher 16 is so carried on the tractor at the rear end thereof that the catcher may be in proper grass catching position as illustrated in FIG. 1, or it may be bodily lifted and removed from the tractor for removing its contents of cut grass, and hence out of such proper grass cutting position, or it may be pivotally tilted upwardly and forwardly toward the seat 15 for dumping its contents of cut grass and hence also out of such proper grass cutting position.

Carried by the tractor at its rear end is an electric reed switch 26 and on the catcher 16 in an appropriate position to influence and actuate the switch 26 is a magnet 26A which actuates the switch in accordance with whether or not the catcher is in its proper grass cutting position, as shown in FIG. 1, on the tractor. There is thus provided sensing means at the rear of the tractor for sensing whether or not the catcher is in its proper grass catching position.

Figure 2:
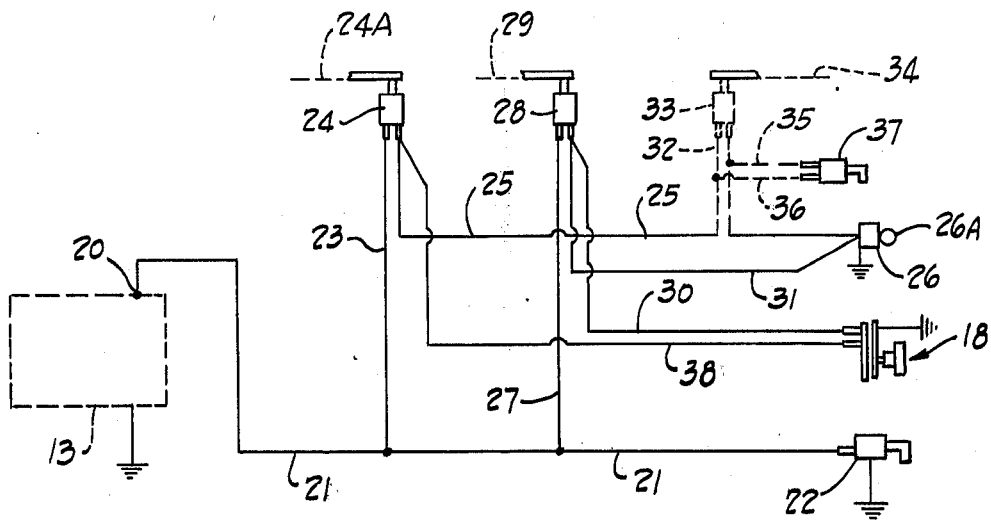
FIG. 2 is a diagrammatical view, including a circuit, illustrating the layout and operation of my improved system in a mower tractor embodying a recoil type manually operable starter.

In tractors embodying a recoil type manually operable starter, as shown in FIG. 1 and illustrated in FIG. 2, the recoil starter mechanism 18 is mounted in a suitable convenient place on the tractor such as in front of the operator as illustrated in FIG. 1. The starter mechanism 18, its mounting means, its locking mechanism, its electrical connections in the grounding circuit, and its mechanical association with the cable or rope of the recoil mechanism are as illustrated and described in U.S. Pat. No. 3,783,216 issued Jan. 1, 1974 in the name of Gerhard R. Plamper and Juergen Kaesgen, and assigned to the assignee of this application. Reference is made to that U.S. Pat. No. 3,783,216 for a detailed showing and description of the starter mechanism 18 and its operation.

With reference to FIG. 2, the engine 13 has an electrical ignition system including a magneto 20 associated with the engine. Grounding of the ignition system such as the magneto 20 prevents the operation of the engine. If the ignition system is grounded the engine will not start, and if the engine is already running the grounding of the ignition system, such as at magneto 20, will stop the engine.

There is a line or wire 21 of the ignition circuit leading from the magneto 20 to the key operated switch 22. A line or wire 23 tapped into line 21, as shown, is electrically connected to a first pole of switch 24. The switch 24 is normally closed when the clutch of the drive transmission is engaged. A linkage 24A (indicated by broken lines) connected to the drive clutch is positioned to engage the movable part of switch 24 and to depress the same to open switch 24 when the drive clutch is disengaged.

A line or wire 27 tapped into line 21, as shown, is electrically connected to a first pole of switch 28. The switch 28 is normally closed when the clutch of the cutter unit is engaged. A linkage 29 (indicated by broken lines) connected to the cutter unit clutch is positioned to engage the movable part of switch 28 and to depress the same to open switch 28 when the clutch of the cutter unit is disengaged.

A line or wire 25 electrically connected to the second pole of switch 24 is connected to a first pole of reed switch 26 at the rear end of the tractor and operated in accordance with whether or not the catcher 16 is in proper grass catching position. The other pole of reed switch 26 is grounded. When the catcher is in proper grass catching position, such as shown in FIG. 1, the switch 26 is normally open. Movement of the catcher 16 to a position away from its said proper grass catching position, and consequent movement of a magnet 26A away from a position to influence the reed switch 26, causes the switch 26 to move to a closed position.

A line or wire 31 electrically connected to switch 28 is electrically connected to reed switch 26 at the pole where line 25 is connected. The other pole of switch 26 is grounded. A line or wire 30 also connected to the second pole of switch 28 is electrically connected to a first pole of recoil mechanism switch 18. A line or wire 38 also connected to the second pole of switch 24 is electrically connected to a second pole of the switch of recoil mechanism 18. The switch of recoil mechanism is normally open when the handle of recoil mechanism is locked in fixed position by the locking means shown and described in said U.S. Pat. No. 3,783,216.

An optional feature is provided by switch 33 positioned to be actuated in accordance with whether or not the seat 15 of the tractor is occupied by the tractor operator. A linkage or lever 34 movable by the seat upon being occupied and depressed is positioned to close the switch 33, which is normally open when the seat 15 is occupied. Switch 33 is closed by linkage 34 when the seat 15 is not occupied. Should the tractor operator accidentally fall off the seat 15 so that it is not occupied, the switch 33 will be closed. Line or wire 32 connected to the two poles of switch 33 and to line or wire 35 provides a bypass of current through switch 33 passing through the line 35.

In the event that it is desired to bypass, and rendered inoperative the function of, switch 33, a bypass key operated switch 37 is provided. Lines or wires 35 and 36 tapped into branches of line 32 and connected to switch 37 will cause current to flow directly through line 32 and lines 35 and 36 and through switch 37 when the switch 37 is normally moved to closed position.

The position of each of the several switches (drive clutch switch 24, cutter switch 28, seat switch 33, catcher switch 26) may be positioned on the tractor and actuatable by the parts thereof as shown and described in the United States patent application being concurrently filed in the name of William E. Turos, assigned to the assignee of this application.

By means of the switches shown and actuable as described in the electrical circuit shown and described, the electrical ignition system at the magneto will be grounded and the engine made inoperable when the switch of recoil mechanism 18 is closed (that is when the recoil handle is not locked in its fixed position), unless both the switches 24 and 28 are open by disengagement of both the drive clutch and the cutter clutch.

Also, by the arrangement of switches and electrical circuit shown and described, if the switch 33 becomes closed by the seat becoming unoccupied (unless switch 33 has been purposely bypassed by manually operated switch 37), the magneto will be grounded and the engine stopped if either switch 24 is closed by engagement of drive clutch or switch 28 is closed by engagement of the drive clutch.

The engine cannot be started with the recoil starting mechanism 18 unless the drive clutch and cutter clutch are disengaged.

In addition, by means of the arrangement of switches and electrical circuit as shown and described, if at any time the reed switch 26 is closed by the movement of the grass catcher out of its proper grass catching position, and the movement of the magnet 26A away from its influence on the reed switch 26 (such as if the catcher is bodily lifted off and away from the tractor or such as when the catcher is pivotally tilted up to dump its contents of cut grass out of its open front end opening), the magneto will be grounded and the engine stopped unless the switch 28 is in an open position by reason of the disengagement of the cutter clutch. Should the catcher be moved out of its proper grass catching position and thus to expose the rear end of the tractor through which cut grass, dust and particles are blown from cutter unit 14 via chute 17, while the clutch of cutter unit is still engaged, the engine will be stopped by a grounding of the magneto.

Figure 3:
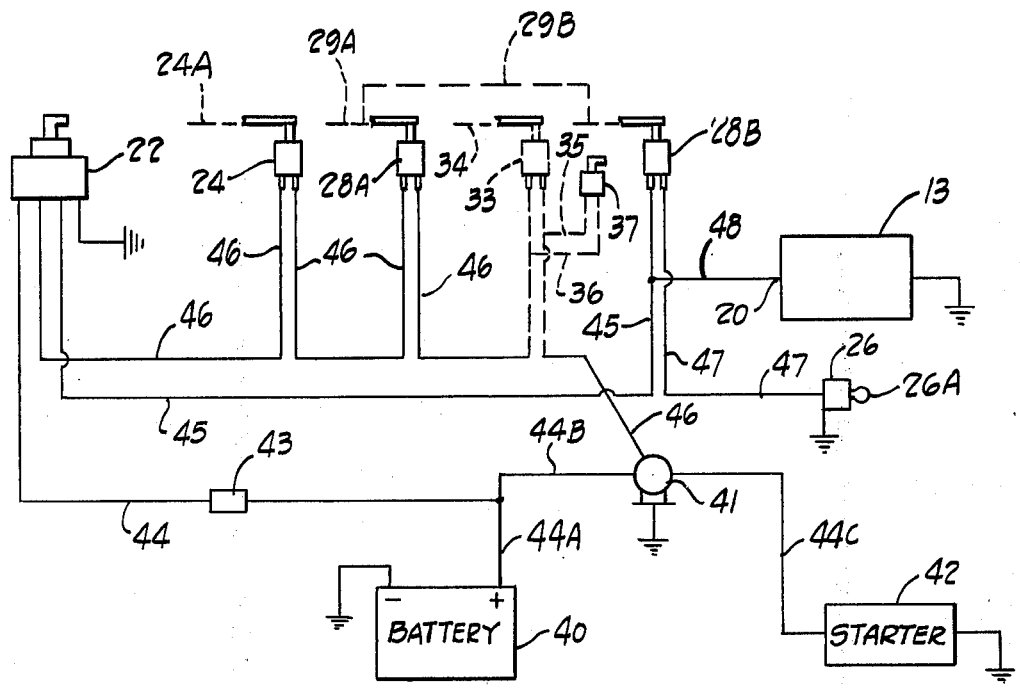
FIG. 3 is a diagrammatical view, including a circuit, illustrating the layout and operation of my improved system in a mower tractor embodying an electric energized starter.

FIG. 3 shows the grounding circuit as applied to a mower tractor having an electrical starter, embodying a usual battery 40, a usual starter 42, and a usual solenoid 41, together with a usual circuit breaker 43. A line or wire 44, having portions 44A, 44B and 44C connect the starter 42, solenoid 41, battery 40 and circuit breaker 43 to starting key switch 22 as shown.

A line or wire 46 connects key switch 22 with solenoid 41, the wire 46 including in series connection the normally closed switch 24 and which may be closed and movable to open condition upon disengagement of the drive clutch. The line or wire 46 also includes in series connection the normally closed switch 28A and which is movable to open condition upon disengagement of the cutter clutch.

There is also included in the arrangement of FIG. 3 another switch actuable in accordance with whether the cutter clutch is engaged or disengaged, this second switch being designated by the reference character 28B. Switch 28B, like switch 24, is normally closed and is movable to open condition upon disengagement of the cutter clutch. A common means made up of links or lever 29A and links or lever 29B mechanically connected to be movable together and actuated by the clutch of the cutter unit is positioned to close both switches 28A and 28B when the clutch of the cutter is disengaged.

The optional feature of the seat controlled switch 33 may be added if desired to the circuit as shown, and the seat switch 33 bypassed by the manually operated switch 37 when it is desired to de-activate the function of the seat switch 33.

A line or wire 45 electrically connects one pole of switch 28B with a pole of key switch 22 as shown. Another line or wire 47 electrically connects a second pole of switch 28B with a pole of reed switch 26, the other pole being grounded as shown. The switch 26 is subject to the influence of magnet 26A carried by the grass catcher. The switch 26 is open when the catcher is in proper place and closed when the catcher, with magnet 26A, is moved from its proper place.

A line or wire 48 tapped into line 45 as shown electrically connects line 45 with the magneto 20 of the ignition system of engine 13.

As described in connection with the circuit arrangement of FIG. 2, the magneto will be grounded when the seat switch 33 is closed unless both the switch 24 is open by disengagement of the drive clutch and the switches 28A and 28B are opened by disengagement of cutter clutch. Also the magneto will be grounded and operation of the engine prevented should the catcher switch 26 be closed unless the switches 28A and 28B are opened by the disengagement of the cutter clutch. The engine cannot be started by reason of grounding of the magneto when the cutter clutch is engaged.

When the engine is operating, electric current from the magneto 20 seeks to reach ground and when it does the ignition circuit is short circuited and the engine stops. By means of the electric circuit and the switches shown and described, this current from the magneto reaches ground unless all of the several movable parts are set in safe condition whereby operation of the engine, such as operation of the cutter and such as operation of the drive mechanism, cannot cause possible injury. By proper engagement and disengagement of the clutches, by connection of the catcher in proper position, and by locking the handle of recoil starting mechanism, the operation of the engine may be controlled by means of the present invention.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In an electrical system for controlling a function of a grass mower driven by an internal combustion engine having a magneto which if grounded stops the operation of the engine, said mower having a grass cutting unit powered by said engine, a clutch for engaging and disengaging the cutting unit with the engine, and a catcher carried by the mower for catching cut grass discharged therefrom when the catcher is in proper grass catching position on the mower, the combination of an electrical switch normally closed when the said clutch is engaged and disposed to be automatically opened upon the disengagement of said clutch, a second electrical switch normally closed when the said catcher is not in its proper grass catching position on the mower and disposed to be automatically opened upon the movement of said catcher to a location where it is at its said proper grass catching position, and electrical circuit means electrically connecting said magneto, said switches and ground to connect the magneto with ground to stop the engine upon the closing of said second switch when the catcher is not in said proper grass catching position unless the said first switch is then open upon the disengagement of said clutch to disconnect the magneto with ground.

2. The electrical system claimed in claim 1 and in which said second switch is a reed switch carried by the mower and said catcher includes a magnet positioned to actuate the reed switch to open position upon the movement of the catcher carrying said magnet to such a position relative to the mower that the magnet influences the reed switch.

3. In an electrical system for controlling functions of a grass mower driven by an internal combustion engine having a magneto which if grounded stops the operation of the engine, said mower having a drive mechanism for moving the mower powered by said engine and having a grass cutting unit powered by said engine, the said mower having a first clutch for engaging and disengaging the cutting unit with the engine, a second clutch for engaging the disengaging the said drive mechanism with said engine, a recoil starting mechanism including a handle for starting the engine upon pulling of the handle in a first direction and locking means for manually locking the handle in fixed position against movement in said first direction, and a catcher carried by the mower for catching cut grass discharged therefrom when the catcher is in proper grass catching position on the mower, the combination of a first electrical switch normally closed when the said first clutch is engaged and disposed to be automatically opened upon the disengagement of said first clutch, a second electrical switch normally closed when the second clutch is closed and disposed to be opened upon the disengagement of said second clutch, a third electrical switch normally closed when the said catcher is not in its proper grass catching position on the mower and disposed to be automatically opened upon the movement of said catcher to a location where it is at its proper grass catching position, a fourth electrical switch normally open when the said handle is locked in said fixed position and disposed to be automatically closed upon said handle being unlocked from said fixed position, and first electrical circuit means electrically connecting said magneto, said first and third switches and ground to stop the engine upon the closing of said third switch when the catcher is not in said proper position unless the said first switch is then open, and second electrical circuit means electrically connecting said magneto, said first, second and fourth switches and ground to stop the engine upon the closing either of said first and second switches unless said fourth switch is then in open position.

4. The electrical system claimed in claim 3 wherein the mower has a seat adapted to be occupied by an operator of the mower and movable between a first position when occupied and a second position when not occupied, and including a fifth electrical switch normally open when the seat is in said first position and disposed to be automatically closed when the seat is in second position, and third electrical circuit means electrically connecting said magneto, said first, second and fifth switches and ground to stop the engine upon the closing of said fifth switch unless said first and second switches are then in open position.

5. The electrical system claimed in claim 4 and in which said first, second and third electrical circuit means connects all said first, second, third, fourth and fifth electrical switches to ground unless said first, second and fifth switches are then in open position.

6. In a grass mower having a cutting unit and a grass catcher, an electrical safety grounding system comprising electrical circuit adapted to be connected to the ground and to an electrical ignition system of an internal combustion engine of the mower, switch means normally open to break the connection between ground and said ignition system, first means for operating the switch means in accordance with the clutched or unclutched condition of the cutting unit, and second means for operating the switch means in accordance with the connected or unconnected condition of the grass catcher, said switch means being operated to make electrical connection between ground and said electrical ignition system by the switch means being operated by said second means upon the said grass catcher being in unconnected condition, unless the switch means is operated by said first means upon the cutting unit being in unclutched condition.

7. The grounding system claimed in claim 6 and including third means for operating the switch means in accordance with the clutched or unclutched condition of a drive mechanism of the mower, and in which the switch means is operated to make electrical connection between ground and said electrical ignition system by the switch means being operated by said third means upon said drive mechanism being in clutched position.

8. In a grass mower having an internal combustion engine with an electrical ignition system for the same, the mower having a cutting unit adapted to be put in clutched and unclutched condition, and having a grass catcher movable to a first position to collect cut grass blown from said cutting unit and to a second position varied from said first position relative to said mower, the combination of first electrical switch operable in accordance with the clutched and unclutched condition of the cutting unit, a second electrical switch operable in accordance with the position of said grass catcher, and electrical circuit means interconnecting said switches, said ignition system and ground to short circuit the said ignition system upon said grass catcher being moved from said first position unless said cutting unit is in unclutched position.

9. In a grass mower having an internal combustion engine with an electrical ignition system for the same, the mower having a cutter unit adapted to be put in clutched and unclutched condition, the mower having a seat adapted to move to be in one position when occupied and to move to be in a second position when unoccupied, the mower having a drive transmission adapted to be put in clutched and unclutched position, first switch means positioned to be actuated in accordance with the clutched and unclutched condition of the cutter unit, second switch means positioned to be actuated in accordance with the location of the seat in said first and second positions, and third switch means positioned to be actuated in accordance with the clutched and unclutched condition of the drive transmission, and electrical circuit means electrically connecting said switches, said ignition system and ground to short circuit the ignition system and stop the engine when said seat is in unoccupied position unless said cutter unit and said drive transmission are in unclutched conditions.

* * * * *